April 18, 1961 F. A. KROHM 2,979,752
WINDSHIELD WIPER ARM ASSEMBLY
Original Filed March 26, 1954 2 Sheets-Sheet 1
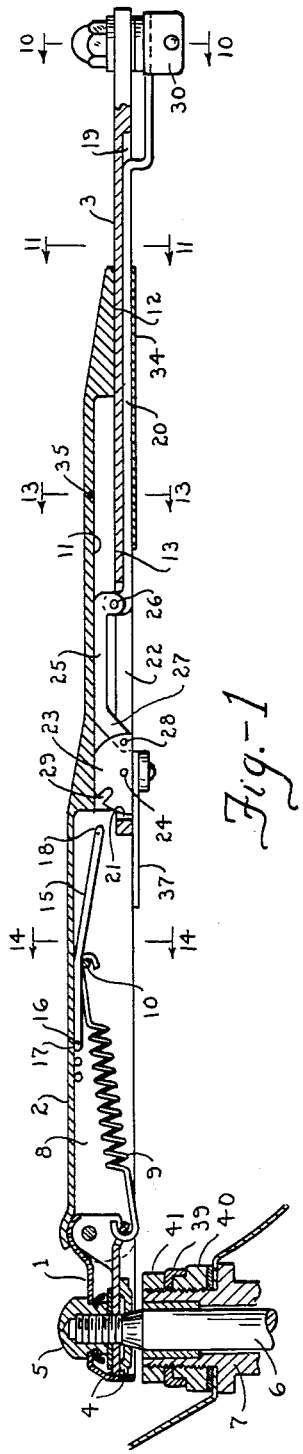
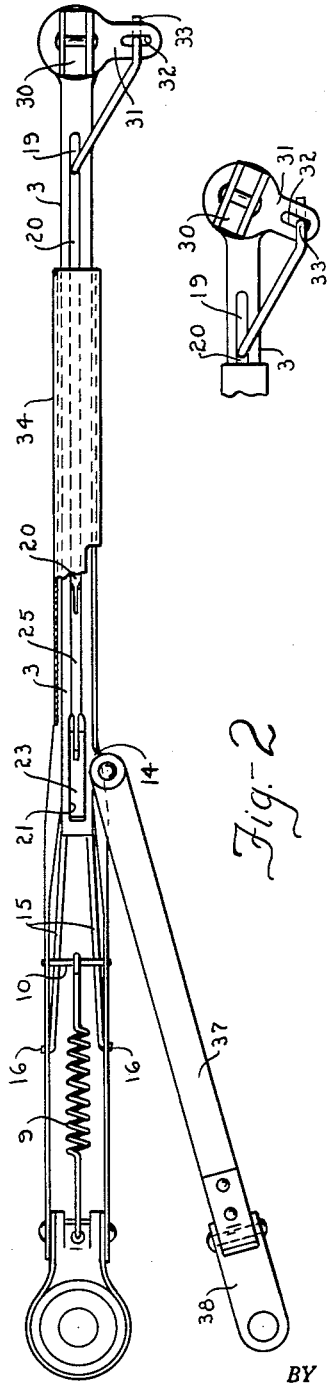
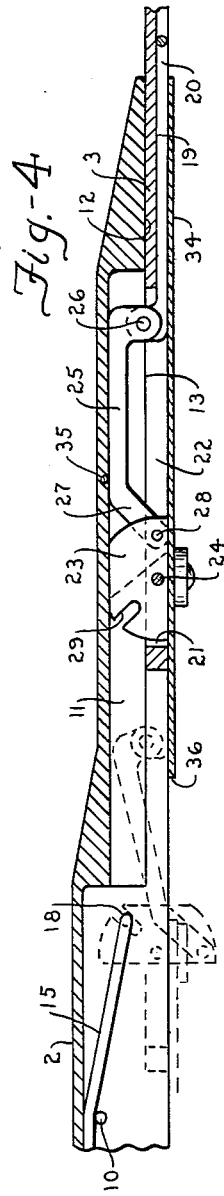
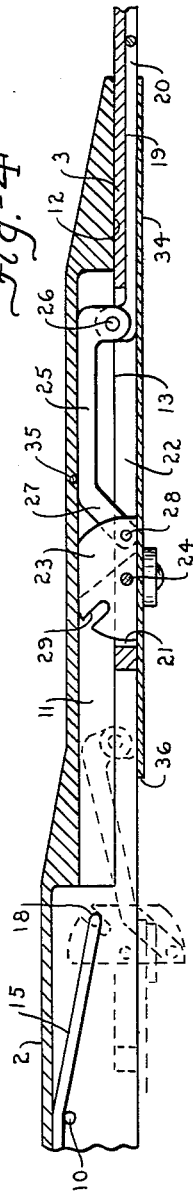
INVENTOR.
FRED A. KROHM
BY
Charles S. Penfold
ATTORNEY April 18, 1961 F. A. KROHM 2,979,752
WINDSHIELD WIPER ARM ASSEMBLY
Original Filed March 26, 1954 2 Sheets-Sheet 2
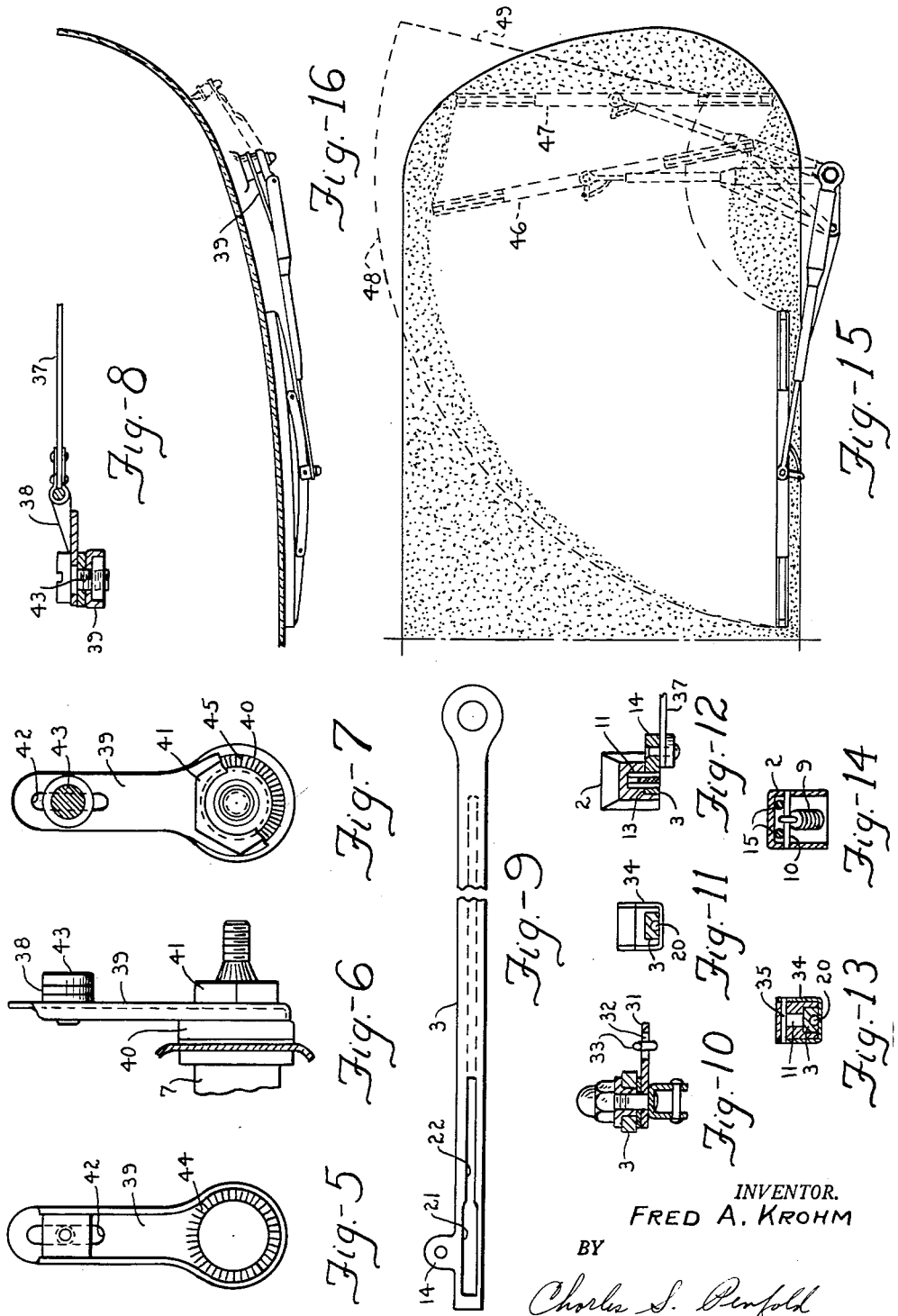
INVENTOR.
FRED A. KROHM
BY
Charles S. Penfold
ATTORNEY United States Patent Office 2,979,752
Patented Apr. 18, 1961

2,979,752

WINDSHIELD WIPER ARM ASSEMBLY

Fred A. Krohm, Hobart, Ind., assignor to The Anderson Company, a corporation of Indiana Continuation of abandoned application Ser. No. 418,932, Mar. 26, 1954. This application Feb. 20, 1959, Ser. No. 794,768

24 Claims. (Cl. 15—250.21)

This invention relates generally to windshield wiper devices and more particularly is directed to a wiper arm and/or combination of an arm assembly with a wiper blade and a movement modifying arm to provide an improved system of wiping a curved surface.

The windshields of automotive vehicles are being made longer and with curved rearwardly extending extremities or wings to promote vision and styling. In the trade, windshields of this character are referred to as the wraparound type.

The design of windshield structures now provided on some vehicles has advanced to an extent where conventional wipers are incapable of satisfactorily cleaning certain areas of a windshield particularly at or adjacent the curved wings. Some areas due to the narrow width and extreme curvature of the glass are not wiped at all by a conventional wiper. In fact a conventional wiper blade operating through a true arc in approaching a wing will leave the windshield so that a portion of the blade will extend into space and/or beyond the edges of the windshield in which event only a small part of the wing is cleaned. This condition results in poor visibility and therefore is detrimental to safe driving.

With the foregoing in mind, one of the principal objects of the invention is to provide wiper apparatus comprising a wiper blade carrying arm with means for reciprocating and pivoting the blade with respect to the longitudinal axis of the arm so that the blade will be caused to readily conform to a particular portion of the windshield to be wiped.

More specifically, the arrangement is such that the blade during a complete stroke in one direction from a parked position will progressively move toward the drive shaft supporting the wiper arm and as the blade approaches the wing portion of the windshield it will be pivoted with respect to the arm so as to reach and wipe a prescribed area which could not be wiped by a blade restricted for movement in a true arc by conventional apparatus. In other words, the invention offers a means whereby the blade during its oscillation across the windshield will be caused to pivot with respect to the arm only at a predetermined location as the blade also moves toward and away from the drive shaft supporting the wiper arm.

More particularly an object of the invention is to provide a novel apparatus comprising, among other things, a primary arm having an inner section for attachment to a drive shaft, an intermediate section pivotally connected to the inner section and an extensible or slidable outer section provided wtih a pivotal connector for supporting a blade; a secondary or movement modifying arm having one end pivoted to the extensible section of the primary arm and its other end arranged for attachment to a pin on a mounting so that when the primary arm is oscillated across a windshield by the drive shaft the extensible section and blade carried by the connector thereon will reciprocate lengthwise with respect to the inner and intermeditae arm sections. The primary arm also includes an actuator pivotally mounted on the inner extremity of the extensible section, a rod section connecting the actuator with the connector to which the blade is attached, and abutment means on the intermediate section which is adapted to be intermittently engaged by the actuator as the arm oscillates to transmit intermittent motion to the connecting means to cause the connecor and blade carried thereby to pivot with respect to the longitudinal axis of the arm.

Another object of the invention is to design and construct the extensible arm section and rod section of the primary arm so that one section nests within the other for guiding purposes and for reducing the over-all thickness of the arm.

An important object of the invention is to provide the intermediate section of the primary arm with means for preventing operation of the actuator until it approaches the abutment means above referred to. In other words, the rod section is held against movement to prevent pivoting of the blade until the actuator is translated to a predetermined position where it is operated by engaging the abutment means. The arrangement is preferably such that the blade can be pivoted to wipe certain critical areas at or adjacent the wing portions of the windshield that could not be reached except for such pivotal motion.

A specific object of the invention is to provide improved means for facilitating adjustment of the abutment means in order to permit operation of the actuator at different locations to transmit pivotal motion to the blade so that it will wipe different areas on the same windshield or areas on windshields of different forms or curvatures.

A further object of the invention is to provide a secondary arm with adjustable means preferably adapted for support on the bearing in which the drive shaft is mounted so as to facilitate initial installation and parking of the windshield wiper apparatus and for regulating the oscillating stroke of the primary arm to promote adjustment thereof to meet different operating requirements.

Additional objects of the invention are to provide wiper apparatus which is durable and positive in operation.

Other objects and advantages of the invention will become apparent after the description hereinafter set forth is considered in connection with the drawings annexed hereto.

In the drawings:

Figure 1 is a longitudinal section of the primary arm structure and also shows the mode of connecting it to a drive shaft;

Figure 2 is a bottom view showing the operative relationship of the primary arm and secondary or movement modifying arm;

Figure 3 is a partial enlarged longitudinal sectional view of the primary arm structure and illustrates the action which takes place when the actuator is moved into engagement with the abutment means;

Figure 4 is a partial bottom view of the primary arm structure and shows that the connector for supporting the blade is pivoted with respect to the extensible arm section when the actuator is operated by the abutment means;

Figure 5 is a bottom view of a fitting which is employed to facilitate connection and adjustment of the secondary arm with respect to the bearing which supports the drive shaft;

Figure 6 is a view with a portion in section for the purpose of depicting the manner in which the fitting is attached to the bearing;

Figure 7 is a front view of the assembly shown in Figure 6 with portions in section to illustrate details of construction;

Figure 8 is a longitudinal view which illustrates the manner in which the secondary arm is connected to the fitting;

Figure 9 is a top view of the extensible arm section;

Figure 10 is a sectional view taken substantially on line 10—10 of Figure 1 illustrating the details of the operative relationship between the connector for supporting the blade and the extensible arm section;

Figure 11 is a transverse section taken substantially on line 11—11 of Figure 1;

Figure 12 is a transverse section taken through an appropriate part of the apparatus depicting details of construction;

Figures 13 and 14 are transverse sectional view respectively taken on lines 13—13 and 14—14 of Figure 1;

Figure 15 is a front view of a windshield showing the different positions of the wiper apparatus and wiper blade associated therewith; and Figure 16 is a partial longitudinal sectional view taken through a windshield showing different positions of the arm structure and wiper blade.

This application is a continuation of my copending application Serial No. 418,932, filed March 26, 1954, now abandoned.

Referring more particularly to the drawings, the primary arm above referred to includes, among other things, an inner section 1, an intermediate section 2 pivotally connected to the inner section, and an extensible section 3 slidably mounted on the intermediate section.

The inner arm section of the primary arm is preferably provided with a pair of relatively movable clutch members 4 and a nut 5 for detachably securing the arm in any one of a number of predetermined fixed positions on a drive shaft 6, the latter of which is rotatably supported in a mounting 7 which extends through the cowl of a vehicle body.

The intermediate section 2 of the primary arm is preferably formed to provide an elongated chamber 8. A helical spring 9 is housed within this chamber and one end of the spring is connected to one of the clutch members on the inner section and its other end to a cross pin 10 on the intermediate section for urging the intermediate and outer arm sections as a unit toward a windshield. The intermediate section is further preferably provided with an elongated recess 11 and a groove 12 of a depth somewhat less than the depth of the recess. The recess is formed with a longitudinal extending shoulder 13 which in effect constitutes a continuation of the base wall of the groove 12. A portion of one side of the intermediate section is preferably removed to provide clearance for an integral lug 14 on the extensible arm section and a bearing therefor, the bearing being disposed in the same plane as the shoulder 13 and the base wall of the groove 12 so that substantially continuous track means are provided for the extensible section.

The intermediate section 2 is further provided with yieldable abutment means preferably in the form of an elongated generally U-shaped spring having legs 15 with offset ends 16 which project outwardly into a pair of holes 17 provided therefor in the side walls of the intermediate section. The spring is interposed between the base wall of the chamber and the cross pin 10 to locate a bridge portion 18 connecting the legs 15 in a predetermined position adjacent the inner end of the recess 11. The abutment means may be constructed in other ways than as herein illustrated but the one shown offers a setup whereby its offset ends may be detachably received in more than one pair of holes in the intermediate section as illustrated so that the bridge portion 18 may be located in different positions for a purpose which will be described subsequently.

The extensible arm section 3 is preferably provided with a longitudinally extending groove 19 in its underside for slidably receiving a connecting rod 20. As clearly shown in Figures 3 and 9, the extensible section is further provided with an elongated generally rectangular opening 21 in its inner end and an adjacent opening 22 located between the opening 21 and the groove 19. An actuator 23 is pivotally mounted in the rectangular opening 21 by means of a pivot 24 extending through the bottom central portion of the actuator and through the extensible section. A link 25 is disposed in the opening 22 and has its forward end pivotally connected by a pin 26 to the connecting rod 20 and its rear offset end 27 to the forward lower corner portion of the actuator by a pin 28. It will be noted that the forward end of the actuator is preferably bifurcated and that the pin 28 extends transversely therethrough including the link and that the outer end of the link is similarly provided with a bifurcation which receives the inner end of the connecting rod 20, the pin 28 extending transversely through the rod and bifurcation. It will be noted that the pivotal connections between the actuator, extensible section and link are located in the plane of the extensible section and that the connection between the link and rod is located in a different plane so as to obtain, among other things, a desirable leverage action. The actuator is further preferably provided with rounded or bevelled end portions and a notch 29 which is adapted to receive the bridge portion 18 of the abutment means as shown in Figure 3 and in a manner which will be explained subsequently.

A connector 30 is pivotally mounted on the free end of the extensible section. This connector may be designed and constructed as desired but, as herein illustrated, preferably includes a channel and a cross pin which are adapted to cooperate with a suitable attachment provided on a wiper blade. The connector is provided with an offset constituting a link 31 which is arranged at an obtuse angle with respect to the longitudinal axis of the connector. The end of the link is provide with a slot 32 and the connecting rod is angled from the extensible section and provided with an upturned offset 33 which slides in the slot when the blade is pivoted with respect to the longitudinal axis of the primary arm by the connecting rod through the agency of the actuator.

A cover 34 in the form of an elongated channel is detachably connected to the underside of the intermediate arm section and, among other things, serves to hold the extensible section and connecting rod operatively associated with one another with the extensible section nesting in the intermediate section and the connecting rod in the extensible section for guiding purposes and to reduce the over-all thickness of the primary arm. It will be noted that the extensible section and connecting rod actually slidably bear on the cover. The cover may be detachably secured to the intermediate section by any suitable means but as herein shown a pin 35 extends through the side walls of the cover and through the intermediate section. It will be noted that an inner portion of the cover is cut away so as to provide clearance for the lug 14 extending outwardly from the inner end of the extensible arm section. It should be further noted that the inner end 36 of the cover as shown in Figure 3 terminates at a predetermined location with reference to the bridge portion 18 of the abutment means.

It is to be understood that it is not necessary that the major portion of the connecting rod nest in the extensible arm section because if found desirable it may be located between the lower surface of the extensible section and the upper surface of the bottom wall of the cover 34. Also, in some instances, it may be desirable to locate the connecting rod in a groove disposed in the upper side of the extensible section or between the upper surface of this section and the base wall of the groove 12 in the intermediate section. Furthermore, means other than a cover such as 34 may be utilized to hold the extensible section and connecting rod in operative relationship with respect to one another and the intermediate arm section.

The arrangement above described is preferably such that when the extensible arm section is moved inwardly a sufficient distance the inner rounded end of the actuator will engage the bridge portion 18 of the spring, and when the extensible section is moved further inwardly the rounded end of the actuator will engage and cam the spring back until the bridge portion 18 moves into the notch, 29, whereupon the actuator is released from the inner end 36 of the cover to permit the actuator and link 25 to take the dotted line positions exemplified in Figure 3 when the extensible section is caused to travel inwardly still further. When the extensible section is moved outwardly, the rounded forward end of the actuator will cam against the bridge portion 18 of the spring and cause the actuator to pivot back to the full line position illustrated in Figures 1 and 3. Whenever the actuator is operated by the spring, the connecting rod 20 causes the connector 30 and blade carried thereby to pivot with respect to the longitudinal axis of the extensible arm section.

It is to be understood that means other than a cover may be employed to determine when the actuator 23 is allowed to pivot when engaged by the bridge 18 of the spring or abutment means. Moreover, it is to be understood that provision may be made to cause the actuator to pivot at more than one location during the travel of the extensible section with respect to the intermediate section so as to actuate the connecting rod to pivot the blade at predetermined areas of the windshield.

Attention is directed to the important fact that the actuator cannot be pivoted while it is confined for movement by the cover. In other words, the actuator cannot be pivoted to reciprocate the connecting rod and so that the latter will pivot the blade until the actuator clears the inner end 36 of the cover. This setup positively assures that the blade will not be pivoted with respect to the longitudinal axis of the arm until the arm reaches a predetermined position during its travel across a windshield.

As depicted in Figures 2, 7 and 8, the secondary or movement modifying arm includes, among other things, an elongated arm 37 and a link 38. The outer end of the arm 37 is pivotally connected to the lug 14 on the extensible section of the primary arm and the link 38 is pivotally connected to the inner end of the secondary arm 37. The link is preferably adjustably connected to an elongated fitting 39, the inner enlarged end of which is preferably detachably connected to the drive shaft mounting 7 by and between a pair of nuts 40 and 41 threaded on the mounting. The outer end of the fitting is provided with a slot 42 through which the shaft 43 of a bolt assembly extends so that the link 38 may be adjustably secured to the fitting for the purpose of varying the travel of the extensible section of the primary arm which carries the wiper blade. The inner enlarged end of the fitting is provided with an aperture through which the threaded portion of the drive shaft mounting extends and is further provided with serrations 44 which cooperate with corresponding serrations 45 preferably provided on the upper end or surface of the nut 40 to firmly secure the fitting in place after adjustment. With this arrangement, the travel of the extensible arm can be varied to suit different installation requirements. The adjustments between the link and fitting and between the fitting and the shaft mounting all contribute toward control of the extensible arm section. The fact that the complete apparatus is supported on the drive shaft and mounting therefor also facilitates installation.

In view of the foregoing, and referring to Figures 15 and 16 of the drawing, the wiper apparatus is shown in a parked position and in different operative positions. When the blade is moved upwardly and toward the right, the blade will take the path shown by the unshaded area. More specifically in this regard, the blade is held against pivotal movement until it reaches or approaches the dotted line position 46 at the beginning of the bent wing portion of the windshield, and as it swings further over to position 47 the movement modifying arm gradually pulls the extensible arm section inwardly, and as the actuator 23 clears the inner end 36 of the cover the bridge 18 of the abutment means will ride into the notch 29 of the actuator to operate the actuator and thereby pull the connecting rod 20 inwardly to pivot the blade so that the blade will substantially wrap itself around a portion of the wing of the windshield. The blade will traverse the same path on its return movement. In addition to wiping a windshield at the places described, the blade is prevented from banging against the windshield frame.

The importance of the invention is perhaps best exemplified in Figure 15 where the blade if mounted for movement through a true arc in the conventional way would cause the blade to travel the path indicated by the dotted lines 48 and cause at least a portion of the blade to swing off the windshield into space as indicated by the dotted line position 49.

Having thus described my invention, it is obvious that various modifications may be made in the same without departing from the spirit of the invention; and, therefore, I do not wish to be understood as limiting myself to the exact forms, constructions, arrangements, and combinations of parts herein shown and described.

I claim:

1. A windshield wiper arm assembly comprising an inner section, an intermediate section pivotally connected to the inner section and an outer extensible section carried by the intermediate section, an actuator movably supported on the extensible section, a connector pivotally mounted on the outer end of the extensible section for supporting a blade, a rod operatively connecting the connector with the actuator, and abutment means carried by the intermediate section for operating the actuator to move the rod to pivot the connector when the extensible section is moved a predetermined distance with respect to the inner section.

2. A windshield wiper arm assembly comprising an inner section, an intermediate section pivotally connected to the inner section and an outer extensible section carried by the intermediate section, an actuator pivotally supported on the inner extremity of the extensible section, a connector pivotally mounted on the outer end of the extensible section for supporting a blade, a rod operatively connecting the connector with the actuator, yieldsupported on the inner extremity of the extensible section, and means for moving the extensible section toward the inner section so that the actuator engages the abutment means to pivot the actuator and thereby move the rod to pivot the connector.

3. A windshield wiper arm assembly comprising an inner section, an intermediate section pivotally connected to the inner section and an outer extensible section slidably mounted on the intermediate section, an actuator carried by and pivotally supported on the inner extremity of the extensible section, a connector pivotally mounted on the outer end of the extensible section for supporting a blade, a rod slidably mounted for movement with respect to the extensible section and operatively connecting the connector with the actuator, abutment means carried by the assembly and disposed for engagement by the actuator, and means for holding the actuator from being pivoted until it is engaged by the abutment means upon movement of the extensible section toward the inner section whereupon the actuator is caused to pivot and move the rod to pivot the connector.

4. A windshield wiper arm assembly comprising an inner section, an intermediate section pivotally connected to the inner section and an outer extensible section slidably carried by the intermediate section, an actuator movably supported on the extensible section, a connector pivotally mounted on the outer end of the extensible section for supporting a blade, a link connected to the actuator, a rod operatively connecting the connector with the link, and abutment means carried by the assembly for operating the actuator and link to move the rod to pivot the connector when the extensible section is moved a predetermined distance with respect to the inner section.

5. A windshield wiper assembly for operation on a windshield having a frontal portion and a wing portion including in combination, a mounting disposed adjacent the windshield, a drive shaft supported for oscillation in the mounting, a wiper arm having an inner section secured to the shaft, an intermediate section pivotally connected to the inner section and an extensible section slidably connected to the intermediate section, a connector pivotally connected to the outer end of the extensible section and supporting a wiper blade, an actuator pivotally mounted on the inner end of the extensible section, elongate means connecting the actuator and connector, abutment means on the intermediate section normally spaced from the actuator, a fitting carried by the shaft mounting, a movement modifying arm having its outer end pivotally connected to the extensible section and its inner end operatively connected to the fitting, the arrangement being such that when the wiper arm and blade are directed across the frontal portion of the windshield the modifying arm pulls the extensible section and blade toward the drive shaft and when the wiper arm and blade approach or reach the wing portion of the windshield the modifying arm pulls the extensible section and blade farther toward the shaft until the actuator engages the abutment means to cause the actuator to pivot and move the elongate means to pivot the connector and blade as the wiper arm and blade move across the wing portion.

6. A windshield wiper assembly for operation on a windshield having a frontal portion and a wing portion including in combination, a mounting disposed adjacent the windshield, a drive shaft supported for oscillation in the mounting, a wiper arm having an inner section secured to the shaft, an intermediate section pivotally connected to the inner section and an extensible section slidably connected to the intermediate section, a connector pivotally connected to the outer end of the extensible section and supporting a wiper blade, an actuator pivotally mounted on the inner end of the extensible section, elongate means connecting the actuator and connector, abutment means on the intermediate section normally spaced from the actuator, a fitting having an extremity spaced from the shaft mounting, a movement modifying arm having its outer end pivotally connected to the extensible section and its inner end operatively connected to the said extremity of the fitting, the arrangement being such that when the wiper arm and blade are directed across the frontal portion of the windshield the modifying arm pulls the extensible section and blade toward the drive shaft and when the wiper arm and blade approach or reach the wing portion of the windshield the modifying arm pulls the extensible section and blade farther toward the shaft until the actuator engages the abutment means to cause the actuator to pivot and move the elongate means to pivot the connector and blade as the wiper arm and blade move across the wing portion.

7. A windshield wiper assembly for operation on a windshield having a frontal portion and a wing portion including in combination, a mounting disposed adjacent the windshield, a drive shaft supported for oscillation in the mounting, a wiper arm having an inner section secured to the shaft, an intermediate section pivotally connected to the inner section and an extensible section slidably connected to the intermediate section, a connector pivotally connected to the outer end of the extensible section and supporting a wiper blade, an actuator pivotally mounted on the inner end of the extensible section, a link connected to the actuator, a rod connecting the link and connector, abutment means on the intermediate section normally spaced from the actuator, a fitting carried by the shaft mounting, a movement modifying arm having one end pivotally connected to the extensible section, a member pivotally connecting the inner end of the modifying arm to the fitting, the arrangement being such that when the wiper arm and blade are directed across the frontal portion of the windshield the modifying arm pulls the extensible section and blade toward the drive shaft and when the wiper arm and blade approach or reach the wing portion of the windshield the modifying arm pulls the extensible section and blade farther toward the shaft until the actuator engages the abutment means to cause the actuator to pivot and move the link and rod to pivot the connector and blade as the wiper arm and blade move across the wing portion.

8. A windshield wiper arm assembly comprising an inner section, an intermediate section pivotally connected to the inner section and an outer extensible section carried by the intermediate section, an actuator movably supported on the extensible section, a connector pivotally mounted on the outer end of the extensible section for supporting a blade, means operatively connecting the connector with the actuator, and means for operating the actuator to move the connecting means to pivot the connector when the extensible section is moved a predetermined distance with respect to the inner section.

9. A windshield wiper arm assembly comprising an inner section, an intermediate section pivotally connected to the inner section and an outer extensible section carried by the intermediate section, a movement modifying member operatively connected to the extensible section, an actuator movably supported on the extensible section, a connector pivotally mounted on the outer end of the extensible section for supporting a blade, elongate means operatively connecting the connector with the actuator, and abutment means carried by the intermediate section for operating the actuator to move the elongate means to pivot the connector when the extensible section is moved a predetermined distance with respect to the inner section by the modifying member.

10. A windshield wiper arm assembly comprising an inner section, an intermediate section pivotally connected to the inner section and an outer extensible section carried by the intermediate section, an actuator pivotally supported on the inner extremity of the extensible section, a connector pivotally mounted on the outer end of the extensible section for supporting a blade, elongate means operatively connecting the connector with the actuator, abutment means carried by the intermediate section, means for moving the extensible section with respect to the inner section so that the actuator will engage the abutment means to pivot the actuator and thereby move the elongate means to pivot the connector, and means whereby said abutment means may be adjusted to engage the actuator to vary the movement of the elongate means.

11. A windshield wiper assembly for operation on a windshield having a frontal portion and a wing portion including in combination, a mounting disposed adjacent the windshield, a drive shaft supported for oscillation in the mounting, a wiper arm having an inner section secured to the shaft, an intermediate section pivotally connected to the inner section and an extensible section slidably connected to the intermediate section, a connector pivotally connected to the outer end of the extensible section and supporting a wiper blade, an actuator pivotally mounted on the inner end of the extensible section, elongate means connected to the actuator and pivotally and slidably connected to the connector, abutment means on the intermediate section normally spaced from the actuator, a fitting adjacent the windshield, a movement modifying arm having its outer end pivotally connected to the extensible section and its inner end pivotally connected to the fitting at a location spaced from the shaft, the arrangement being such that when the wiper arm and blade are directed across the frontal portion of the windshield the modifying arm pulls the extensible section and blade toward the drive shaft and when the wiper arm and blade approach or reach the wing portion of the windshield the modifying arm pulls the extensible section and blade farther toward the shaft until the actuator engages the abutments means to cause the actuator to pivot and move the elongate means to pivot the connector and blade as the wiper arm and blade move across the wing portion.

12. A windshield wiper assembly for operation on a windshield having a frontal portion and a wing portion including in combination, a mounting disposed adjacent the windshield, a drive shaft supported for oscillation in the mounting, a wiper arm having an inner section secured to the shaft, an intermediate section pivotally connected to the inner section and an extensible section slidably connected to the intermediate section, a connector pivotally connected to the outer end of the extensible section and supporting a wiper blade, an actuator pivotally mounted on the extensible section, a link connected to the actuator, a rod connecting the link and connector, abutment means on the wiper arm normally spaced from the actuator, a fitting mounted adjacent the windshield, a movement modifying arm having one end pivotally connected to the extensible section, a member pivotally connecting the inner end of the modifying arm to the fitting, the arrangement being such that when the wiper arm and blade are directed across the frontal portion of the windshield the modifying arm pulls the extensible section and blade toward the drive shaft and when the wiper arm and blade approach or reach the wing portion of the windshield the modifying arm pulls the extensible section and blade farther toward the shaft until the actuator engages the abutment means to cause the actuator to pivot and move the link and rod to pivot the connector and blade as the wiper arm and blade move across the wing portion.

13. A windshield wiper arm assembly comprising an inner section, an outer section slidable on the inner section, an actuator, a connector pivotally mounted on the outer end of the outer section for supporting a blade, means operatively connecting the connector with the actuator, means for operating the actuator to move the connecting means to pivot the connector when the outer section is moved with respect to the inner section, and means for sliding the outer section with respect to the inner section.

14. A windshield wiper arm assembly comprising an inner section, an outer extensible section carried by the inner section, an actuator, a connector pivotally mounted on the outer end of the extensible section for supporting a blade, a rod operatively connecting the connector with the actuator, means carried by the inner section in the path of movement of said actuator, and means for moving the extensible section relative to the inner section so that the actuator will cooperate with the carried means to actuate the actuator and thereby move the rod to pivot the connector.

15. A windshield wiper arm assembly comprising a first section, an outer extensible section slidably mounted on the first section, an actuator carried by and pivotally supported on the inner extremity of the outer section, a connector pivotally mounted on the outer end of the outer section for supporting a blade, a rod mounted for movement with respect to the outer section and operatively connecting the connector with the actuator, means disposed for cooperation with the actuator, and means for holding the actuator from being pivoted until it cooperates with the disposed means upon movement of the outer section toward the first section whereupon the actuator is caused to pivot and move the rod to pivot the connector.

16. A windshield wiper subassembly comprising a first section, an elongate extensible section having an inner portion supported for longitudinal movement on the first section, means mounted for movement on the outer end of the extensible section for supporting a blade, and means carried on at least one of the sections and longitudinally movable thereon for actuating the mounted means when the extensible section is moved relative to the first section.

17. A windshield wiper arm assembly mounted on a vehicle for cyclic oscillatory movement across a windshield, said assembly including means for biasing the arm toward the windshield, a blade supporting connector mounted on the arm, and means connected between the arm and the vehicle for causing movement of the connector lengthwise of the arm responsive to the cyclic movement and for causing pivotal movement of the connector during at least a portion of the lengthwise movement.

18. A device for wiping a curved windshield of a vehicle comprising a drive shaft journalled on a portion of the vehicle in the vicinity of a windshield margin, said shaft being adapted to be oscillated, an arm carried by said shaft for oscillation therewith, a wiper blade carried by said arm and mounted for pivotal movement relative thereto, said arm intermediate said blade and said shaft being provided with relatively extensible sections adapted to accommodate elongation and retraction of said arm, means responsive to oscillation of said shaft to effect elongation and retraction of said arm, and means extending between said blade and said shaft to pivot said blade relative to said arm as an incident to relative longitudinal movement between the extensible arm sections.

19. A device for wiping a curved windshield of a vehicle comprising a drive shaft journalled on a portion of the vehicle in the vicinity of a windshield margin, said shaft being adapted to be oscillated, an arm carried by said shaft for oscillation therewith, a wiper blade carried by said arm and mounted for pivotal movement relative thereto, said arm intermediate said blade and said shaft being provided with sections adapted to accommodate elongation and retraction of said arm, means responsive to oscillation of said shaft to effect elongation and retraction of said arm, and means to pivot said blade relative to said arm as an incident to relative movement between the arm sections.

20. A device for wiping a curved windshield of a vehicle comprising a drive shaft journalled on a portion of the vehicle in the vicinity of a windshield margin, said shaft being adapted to be oscillated, an arm carried by said shaft for oscillation therewith, a wiper blade carried by said arm and mounted for pivotal movement about an axis which extends in a direction substantially normal to said windshield, said arm intermediate said blade and said shaft being provided with relatively longitudinally slidable sections for varying the length of the arm, means responsive to oscillation of said shaft to effect slidable movement between the arm sections, and lever means pivotally carried by one of said slidable sections and extending laterally from said axis, said lever means being adapted to induce pivotal movement of said blade relative to said arm in response to movement of said lever means as an incident to such sliding movement of the arm sections.

21. A device for wiping a curved windshield of a vehicle comprising a drive shaft journalled on a portion of the vehicle in the vicinity of a windshield margin, said shaft being adapted to be oscillated through repeated cycles including rotation in a first direction and return, an arm mechanism carried by said shaft for oscillation therewith, a wiper blade carried by said arm mechanism and mounted for pivotal movement relative thereto, said arm mechanism intermediate said blade and said shaft comprising a plurality of cooperating elements mounted for movement relative to each other to alter the effective radius of the arm mechanism, means operative to effect relative movement of said elements as an incident to each cycle of oscillation of said arm mechanism, and means to pivot said blade relative to said arm as an incident to relative movement of said arm elements.

22. A device for wiping a curved windshield of a vehicle comprising a drive shaft journalled on a portion of the vehicle in the vicinity of a windshield margin, said shaft being adapted to be oscillated through repeated cycles including rotation in a first direction and return, an arm mechanism carried by said shaft for oscillation therewith, a wiper blade carried by said arm mechanism and mounted for pivotal movement relative thereto, said arm mechanism intermediate said blade and said shaft being provided with relatively longitudinally movable sections adapted to vary the length of the arm, one of said sections suporting said wiper blade and another of said sections being mounted for movement with said shaft, and means operative to effect relative movement between said sections as an incident to each cycle of oscillation of said arm mechanism, said means including cooperating extensible elements respectively carried on said arm mechanism and on means fixed on said vehicle to pivot said blade relative to said arm as an incident to such relative movement between said arm sections.

23. A device for wiping a curved windshield of a vehicle comprising a drive shaft journalled on a portion of the vehicle in the vicinity of a windshield margin, said shaft being adapted to be oscillated, an arm carried by said shaft for oscillation therewith, a wiper blade carried by said arm and mounted for pivotal movement relative thereto, said arm intermediate said blade and said shaft having relatively movable sections adapted to vary the length of the arm, one of said sections supporting said wiper blade and another of said sections being mounted for movement with said shaft, means to effect relative movement between the arm sections in response to oscillation of said shaft, and means operatively connected to said blade and to said oscillating assembly to pivot said blade relative to said arm as an incident to such relative movement betwen said arm sections.

24. In combination: a bearing assembly, a drive shaft journalled in the bearing assembly, a windshield wiper arm having an inner structure attached to the shaft and an outer blade-carrying section supported for longitudinal movement on the structure, an elongate fitting having one end adjustably secured to the bearing assembly, a movement-modifying arm having an outer end connected to said outer section, and means adjustably connecting an inner end of the modifying arm and an outer end of the fitting so that when the drive shaft is operated to drive the wiper arm, the modifying arm will cause the outer section to move longitudinally with respect to the inner arm structure.

References Cited in the file of this patent
UNITED STATES PATENTS

| | | |
|---|---|---|
| 1,660,971 | Lindner | Feb. 28, 1928 |
| 2,079,399 | Drew | May 4, 1937 |
| 2,185,572 | Sawyer | Jan. 2, 1940 |
| 2,356,424 | Paton | Aug. 22, 1944 |
| 2,412,319 | Carey | Dec. 10, 1946 |
| 2,533,963 | Sacchini | Dec. 12, 1950 |
| 2,634,447 | Domek et al. | Apr. 14, 1953 |
| 2,775,780 | Pisano | Jan. 1, 1957 |

FOREIGN PATENTS

| | | |
|---|---|---|
| 625,469 | Germany | May 20, 1934 |

UNITED STATES PATENT OFFICE
CERTIFICATE OF CORRECTION

Patent No. 2,979,752            April 18, 1961

Fred A. Krohm

It is hereby certified that error appears in the above numbered patent requiring correction and that the said Letters Patent should read as corrected below.

Column 3, line 14, for "view" read -- views --; column 4, line 35, for "provide" read -- provided --; column 5, line 6, for "notch, 29" read -- notch 29 --; column 6, lines 47 and 48, for "yield-supported on the inner extremity of the extensible section" read -- yieldable abutment means carried by the intermediate section --.

Signed and sealed this 21st day of November 1961.

(SEAL)
Attest:

ERNEST W. SWIDER
Attesting Officer

DAVID L. LADD
Commissioner of Patents
USCOMM-DC